United States Patent
Bhagwat (10) Patent No.: US 7,870,048 B2
(45) Date of Patent: Jan. 11, 2011

(54) METHOD AND SYSTEM FOR FLEXIBLE SCHEDULING OF REPAYMENT OF A LOAN

(75) Inventor: Mandar Arvind Bhagwat, Mumbai (IN)

(73) Assignee: Oracle Financial Services Software Limited, Mumbai (IN)

(*) Notice: Subject to any disclaimer, the term of this patent is extended or adjusted under 35 U.S.C. 154(b) by 100 days.

(21) Appl. No.: 12/017,051

(22) Filed: Jan. 21, 2008

(65) Prior Publication Data

US 2009/0210339 A1    Aug. 20, 2009

(51) Int. Cl.
    *G06Q 40/00*    (2006.01)
(52) U.S. Cl. .................................. 705/35; 705/37
(58) Field of Classification Search .................. 705/35
    See application file for complete search history.

(56) References Cited

U.S. PATENT DOCUMENTS

| | | | | |
|---|---|---|---|---|
| 4,742,457 A | * | 5/1988 | Leon et al. | 705/35 |
| 5,983,206 A | * | 11/1999 | Oppenheimer | 705/38 |
| 2003/0033212 A1 | * | 2/2003 | Sandhu et al. | 705/26 |
| 2008/0262956 A1 | * | 10/2008 | De La Motte | 705/37 |

* cited by examiner

*Primary Examiner*—Ella Colbert
*Assistant Examiner*—John A Anderson
(74) *Attorney, Agent, or Firm*—Narendra Reddy Thappeta (57) ABSTRACT

The present invention relates to a method, system and computer program product for displaying a flexible schedule for repayment of a loan. The method comprises computing an effective rate of interest on the basis of a nominal rate of interest and a compounding frequency and calculating installments to be paid based on a principal loan amount, a loan term, a disbursement date, the effective rate of interest and a predetermined set of parameters. Multiple installments of a fixed or variable amount can be paid in a particular period of time. The method facilitates entering user selected parameters such as accrual basis, bullet payment amount and period, payment holiday period and incrementing and/or decrementing installments in corresponding predefined period(s).

24 Claims, 3 Drawing Sheets

METHOD AND SYSTEM FOR FLEXIBLE SCHEDULING OF REPAYMENT OF A LOAN

RELATED APPLICATIONS

Benefit is claimed under 35 U.S.C. 119(a)-(d) to Foreign application Ser. 717/MUM/2007, entitled "A METHOD AND SYSTEM FOR FLEXIBLE SCHEDULING OF REPAYMENT OF A LOAN" by Mandar Arvind Bhagwat filed on 11 Apr., 2007, which is herein incorporated in its entirety by reference for all purposes.

FIELD OF THE INVENTION

The present invention relates generally to management of financial transactions. More particularly, the present invention relates to a method and system for repayment of a loan or mortgage.

BACKGROUND OF THE INVENTION

Banking and financial institutions (hereinafter referred to as 'financial institutions') provide loan or mortgage facilities (hereinafter referred to as 'loan') to people for fulfilling their various monetary needs e.g. purchase of homes, automobiles, consumer durables, etc. Such loan facilities involve a number of monetary transactions. The borrower avails the loan facilities provided by the lenders (e.g. financial institutions) and for the amount borrowed by the borrower; the lender levies a rate of interest usually on a per annum basis. The borrower pays back the borrowed amount in form of number of installments. The borrower may be an individual or an enterprise.

A loan is granted to a borrower on the basis of agreed conditions between a financial institution and the borrower such as a principle loan amount, a time duration of the loan (or loan term), an annual interest rate (or nominal rate of interest), a time period of repayment and hence the installments or payback amount. The installments are due at pre-determined payment intervals e.g. monthly installments during the tenure or term of the loan.

The existing systems and methods provide financial institutions with a rigid installment repayment schedule that usually allows a fixed number of periodic equal sized installments. The installments have to be made on a set date, for example the 15th of every month. This results in a linear repayment schedule. The problem arises when an irregular or non-linear schedule has to be developed for loan repayment with multiple installments in a period, for example $20^{th}$ and $30^{th}$ of each month, or $10^{th}$ and $25^{th}$ of each month. To be able to design a loan repayment schedule for such a case, the installment calculation has to be done manually.

Financial institutions also offer the service of incorporating unplanned partial pay-offs and advance payments into the loan schedule. In a case where there arises a need to include an unplanned or a partial pay-off, systems typically initiate a rescheduling of the loan. However, the problem arises in a case wherein a loan repayment schedule requires incorporating planned bullet payments or planned payment holidays. Further, it is generally desirable to incorporate other flexibilities such as provision for an incrementing and/or decrementing installment for predefined period(s) for incrementing and/or decrementing the installment according to the user's requirements.

Financial institutions may consider differing accrual bases to generate loan repayment schedules based on their policies and/or government regulations. Periodic installments are determined using the accrual basis. The commonly used accrual basis are US30/360, US30/Actual, US30/365, Actual/Actual, Actual/365 and Actual/360. The existing systems and methods typically employ only one of the above mentioned accrual bases for computing the loan repayment schedule. It is generally difficult to incorporate or switch over to a different accrual basis in certain situations. For example, the US30/360 basis assumes that a year of 360 days is spread over 12 months uniformly containing 30 days in each month. A system employing this basis will usually not be able to calculate installments on an Actual/Actual basis where it is assumed that a year has 365 days (and 366 for leap year). Therefore, there is a need of a method and/or system which caters to varying accrual bases as per the requirements of the user.

Existing systems and methods typically do not provide sufficient flexibility to conveniently incorporate and accommodate various user selected parameters such as bonus payments or bullet payments into the installments, e.g. when a borrower chooses to pay USD 10,000 as installment every December or the borrower opts for an annual bonus payment which is twelve times the original installment. It is difficult to provide sufficient flexibility for scheduling repayment of the loan with available systems without initiating a complete rescheduling of the loan. This may cause inconvenience to the borrower (hereinafter referred to as 'user') and/or the lender who wish to structure/schedule a flexible and non-linear loan repayment schedule. This strengthens the need for the present invention, for systems and methods for structuring/scheduling a loan with irregular or nonlinear and regular or linear installment payment options while catering to various accrual bases.

Generally, an investment gains build up not only on the principal amount, but also on the interest earned by compounding. Compounding is often used to describe the frequency with which financial institutions add interest onto the principal. The more often compounding happens (e.g. some banks compound daily), higher is the interest earned on the investment. The rate of interest quoted by the banks and financial institutions is known as the nominal rate of interest. The nominal rate of interest is specified generally on a per annum basis. But if interest is compounded more than once a year, the actual rate of interest paid or received, called the effective rate of interest, is higher than the nominal rate of interest. For example if a sum of USD 100 is lent at 12% per annum, then the user (borrower) is liable to pay USD 12 as interest at the end of one completed year. However, if the user pays 100*0.12/12=USD 1 each month for 12 months (as a typical equated monthly installment scheme would arrive at), then the rate earned by the lender is actually higher than what the lender would have earned if he were to get USD 12 at the end of the year. USD 1 every month is much higher in value than USD 12 in the end of the year. In practice a loan is expressed in nominal rate per annum while the actual rate charged to the borrower is as per the number of payment periods in a year. This implies that the actual rate earned by the lender becomes higher than the nominal rate. This typically results in an accumulated adjustment installment at the end of the loan tenure. It is hence desirable to consider an effective rate of interest in order to schedule more accurate installment amounts which result in zero or minimum adjustment installment at the end of the loan period. Thus there is a need of flexible methods and/or systems to overcome above mentioned and other drawbacks of the existing systems.

SUMMARY OF THE INVENTION

Accordingly an aspect of the present invention provides a method, system and computer program product for generating and displaying a flexible schedule for repayment of a loan taking into account among others, a variety of flexible options for a user such as varying accrual bases, one or more payment holidays, multiple installments of fixed or variable amounts at one or more predetermined period(s) of time, incrementing or decrementing installments and bullet payments.

In order to meet the above criteria, a computer implemented method is provided, for generating and displaying a flexible schedule for repayment of a loan. The method comprises computing an effective rate of interest on the basis of a nominal rate of interest and compounding frequency, calculating installments to be paid based on a principal loan amount, a loan term, a disbursement date, the effective rate of interest and a predetermined set of parameters, wherein the installments are payable on at least one predetermined date at one or more predetermined period(s) of time, generating a schedule for repayment of the loan on the basis of calculated installments and displaying a schedule for repayment of the loan. The method and system of the present invention enables the flexible scheduling for the repayment of the loan with irregular/nonlinear or regular/linear installment payment options while catering to various accrual bases.

Another object of the present invention is to provide a method and system for generating and displaying a flexible schedule for the repayment of a loan. The method comprises facilitating a user to enter a principal loan amount, a loan term, a disbursement date, a nominal rate of interest, a compounding frequency and a predetermined set of parameters on a graphical user interface. The predetermined set of parameters comprises various combinations of parameters selected from an installment frequency, an accrual basis, a number of installments in a period, dates of installments, date of first installment, period frequency, bullet payment amount, bullet payment frequency, bullet payment type, one or more bullet payment date(s), an incrementing payment amount, an incrementing payment type, one or more incrementing installment period(s), a decrementing payment amount, a decrementing payment type, one or more decrementing installment period(s), a payment holiday and one or more payment holiday period(s). The method then enables calculation of installments to be paid based on a principal loan amount, a loan term, a disbursement date, the effective rate of interest and the predetermined set of parameters. The effective rate of interest is determined on the basis of the nominal rate of interest and the compounding frequency and the installments are payable on at least one predetermined date at one or more predetermined period(s) of time. The method further generates a schedule for repayment of the loan on the basis of calculated installments and a flexible schedule for repayment of the loan is displayed.

BRIEF DESCRIPTION OF THE DRAWINGS

The foregoing objects and advantages of the present invention for a method and a system for generating and displaying a flexible schedule for repayment of a loan may be more readily understood by one skilled in the art with reference being had to the following detailed description of several embodiments thereof, taken in conjunction with the accompanying drawings wherein like elements are designated by identical reference numerals throughout the several views, and in which.

DETAILED DESCRIPTION

Before describing in detail embodiments that are in accordance with the present invention, it should be observed that the embodiments reside primarily in combinations of method steps and system components related to a method and system for generating and displaying a flexible schedule for repayment of a loan. Accordingly, the system modules and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

In this document, relational terms such as first and second and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art.

Various embodiments of the present invention provide a method, system and computer program product for generating and displaying a flexible schedule for repayment of a loan. The method comprises computing an effective rate of interest. The effective rate of interest is computed on the basis of a nominal rate of interest and a compounding frequency. The method further comprises calculating installments to be paid based on a principal loan amount, a loan term, a disbursement date, the effective rate of interest and a predetermined set of parameters. The installments are payable on at least one predetermined date at one or more predetermined period(s) of time. Thereafter, the method enables generating a schedule for repayment of the loan on the basis of the calculated installments and displaying a schedule for repayment of the loan. The predetermined set of parameters to be selected for the purposes of the calculations of installments comprises various combinations of parameters selected from an installment frequency, an accrual basis, a number of installments in a period, dates of installments, date of first installment, period frequency, bullet payment amount, bullet payment frequency, bullet payment type, one or more bullet payment date(s), an incrementing payment amount, an incrementing payment type, one or more incrementing installment period(s), a decrementing payment amount, a decrementing payment type, one or more decrementing installment period(s), a payment holiday and one or more payment holiday period(s). In an embodiment of the present invention, a user is facilitated to enter a principal loan amount, a loan term, a disbursement date, a nominal rate of interest, a compounding frequency and a predetermined set of parameters on a graphical user interface.

Figure 1:
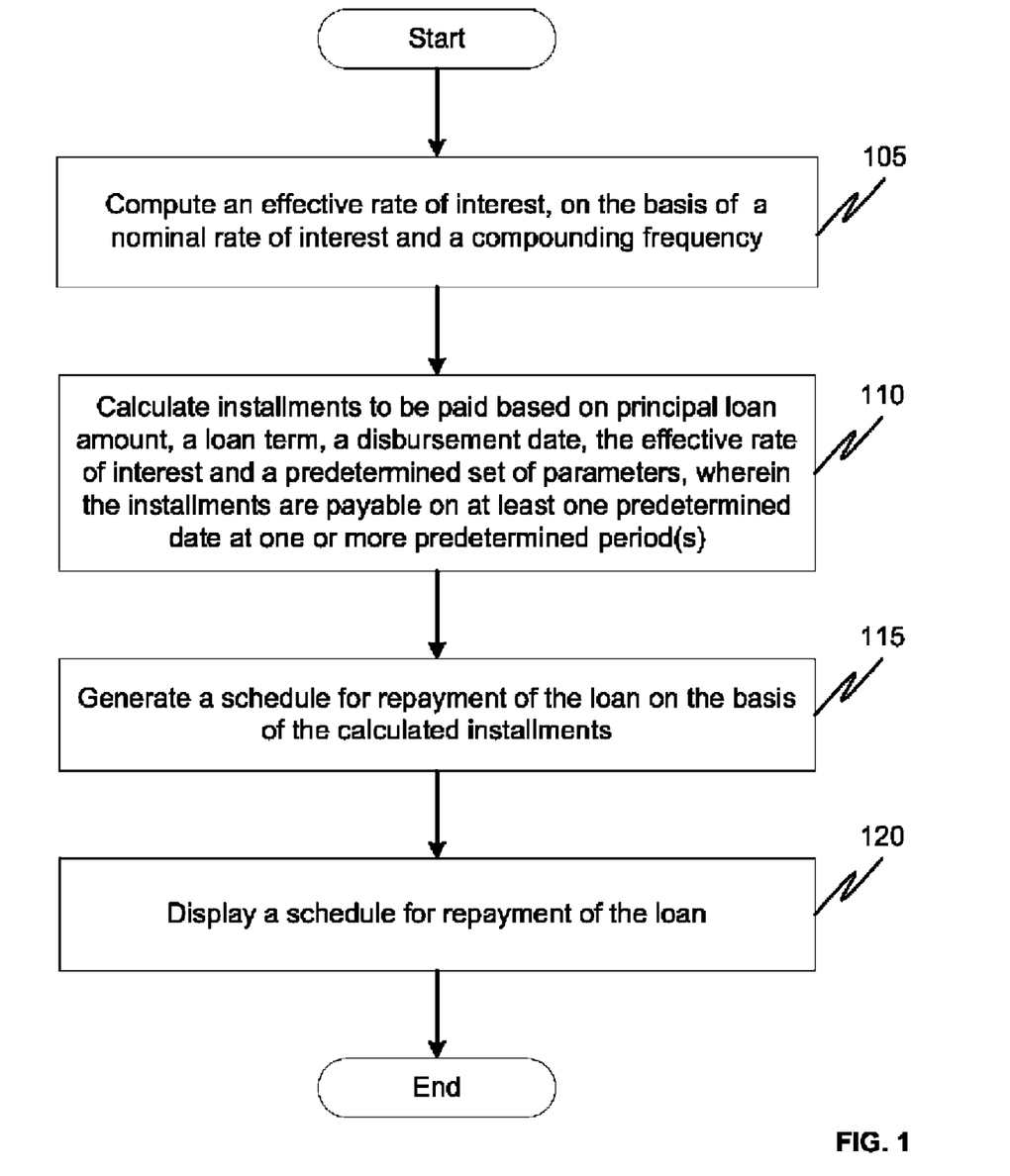
FIG. 1 illustrates a flow diagram for a method for generating and displaying a flexible schedule for repayment of a loan, in accordance with an embodiment of the present invention.

FIG. 1 is a flow diagram illustrating a method for generating and displaying a flexible schedule for repayment of a loan, in accordance with an embodiment of the present invention. At step 105, an effective rate of interest is computed. The effective rate of interest is computed on the basis of a nominal rate of interest and a compounding frequency. Further, the effective rate of interest is the actual rate of interest paid (or earned) if interest is compounded more than once a year. The compounding frequency is the number of times the financial institution compounds interest on the loan or the deposit. A person skilled in the art would appreciate that the effective rate of interest is usually higher than the nominal interest rate.

It would be apparent to a person skilled in the art that the nominal interest and equated periodic installments (like Equated Monthly Installments or EMIs) based on the nominal interest can be computed using known methods and formulas. In an embodiment of the present invention, a user inputs a nominal interest rate and a compounding frequency for the purpose of calculating the effective rate of interest. The effective rate of interest, thus obtained, may be used for further calculations in order to generate and display the schedule for repayment of the loan. The usage of effective rate of interest results in more accurate installments for the loan repayment schedule and in turn minimizing an adjustment installment. The adjustment installment is generally the last installment which is different from the computed equated installments. In an embodiment of the present invention, the compounding frequency is a continuous compounding frequency. In an embodiment of the present invention, the user inputs a principal loan amount, a loan term, a disbursement date, the effective rate of interest and a predetermined set of parameters in order to generate and display a flexible and/or customized schedule for repayment of a loan as per his/her requirements. In an embodiment of the present invention, the predetermined set of parameters comprises various combinations of parameters selected from, the installment frequency, an accrual basis, a number of installments in a period, dates of installments, date of first installment, period frequency, bullet payment amount, bullet payment frequency, bullet payment type, one or more bullet payment date(s), an incrementing payment amount, an incrementing payment type, one or more incrementing installment period(s), a decrementing payment amount, a decrementing payment type, one or more decrementing installment period(s), a payment holiday and one or more payment holiday period(s).

The method further comprises calculating installments to be paid based on based on a principal loan amount, a loan term, a disbursement date, the effective rate of interest, and a predetermined set of parameters at step 110. In an embodiment of the present invention, the predetermined set of parameters to be entered/selected by the user comprises various combinations of parameters selected from, an installment frequency, an accrual basis, a number of installments in a period, dates of installments, date of first installment, period frequency, bullet payment amount, bullet payment frequency, bullet payment type, one or more bullet payment date(s), an incrementing payment amount, an incrementing payment type, one or more incrementing installment period(s), a decrementing payment amount, a decrementing payment type, one or more decrementing installment period(s), a payment holiday and one or more payment holiday period(s). The installments are payable on at least one predetermined date at one or more predetermined period(s) of time. In an embodiment of the present invention, the installments to be paid comprise one or more installments of variable amounts. The one or more predetermined period(s) of time can be a regular period or an irregular period or a combination of a regular period and an irregular period. For example, the installments can be paid on one or more predetermined date(s) on one or more of a weekly basis, fortnightly basis, monthly basis, bimonthly basis, quarterly basis, half yearly basis, yearly basis and an irregular basis. According to an embodiment, the irregular dates can be of any pattern, for example, two or more installments in a month. Further, a plurality of installments are payable at one or more predetermined date(s) on the basis of the period frequency, number of installments to paid, dates of installments and a date of first installment. According to an embodiment of the present invention, in each period the number of installments is defined along with the corresponding installment dates. Further, a first installment date can be defined by the user, irrespective of an immediate installment payment date as per the schedule.

In an exemplary embodiment of the present invention, the predetermined set of parameters comprises an accrual basis, a number of installments in a period, dates of installments, date of first installment, period frequency, bullet payment amount, bullet payment frequency, bullet payment type and one or more bullet payment date(s). In another exemplary embodiment of the present invention, the predetermined set of parameters comprises an accrual basis, a number of installments in a period, dates of installments, date of first installment, period frequency, an incrementing payment amount, an incrementing payment type and one or more incrementing installment period(s). In yet another embodiment of the present invention, the predetermined set of parameters comprises an accrual basis, a number of installments in a period, dates of installments, date of first installment, period frequency, a decrementing payment amount, a decrementing payment type and one or more decrementing installment period(s). In an embodiment, the predetermined set of parameters comprises an accrual basis, a number of installments in a period, dates of installments, date of first installment, period frequency, an incrementing payment amount, an incrementing payment type and one or more incrementing installment period(s), a decrementing payment amount, a decrementing payment type and one or more decrementing installment period(s). In this case one or more incrementing installment(s) is (are) scheduled for at least one corresponding predetermined period of time and at least one decrementing installment is scheduled for at least one corresponding predetermined period of time. For example, the use can schedule an incrementing installment for a particular period by way of selecting a start date and an end date and he can schedule a decrementing installment for a particular period by selecting a start date and an end date. The user can choose an option for the type of incrementing and/or decrementing installments such as a percentage of original installment, a flat amount or a combination of a percentage of original installment and a flat amount. In an embodiment, the predetermined set of parameters comprises an accrual basis, a number of installments in a period, dates of installments, date of first installment, period frequency, an incrementing payment amount, an incrementing payment type and one or more incrementing installment period(s), a decrementing payment amount, a decrementing payment type, one or more decrementing installment period(s), bullet payment amount, bullet payment frequency, bullet payment type, one or more bullet payment date(s), a payment holiday and one or more payment holiday period(s). In this case, the user can explore various flexibilities provided by the method of the present invention, in order to generate and display a flexible and/or customized schedule for repayment of the loan. It is evident from the above description that user can select various combinations of parameters to generate and display the flexible schedule for repayment of the loan as per his/her convenience.

In an embodiment of the present invention, a user is provided with an option of making one or more bullet payments with a predetermined bullet payment frequency during the term of the loan. In an embodiment of the present invention, the user may choose an option for the type of bullet payment such as a multiple of original installment, a flat amount or a combination of a multiple of original installment and a flat amount. Accordingly, the bullet payment may be of various types such as a multiple of original installment, a flat amount or a combination of a multiple of original installment and a flat amount. The multiple of original installment refers to the number of times the original installment the user wishes to pay as a bullet payment e.g. if the user chooses to pay ten times the original installment and the original installment is USD 100 then the amount to be paid as the bullet payment will be USD 1000. The flat amount refers to any amount of money the user wishes to pay on a specific date (e.g., USD 500 on 24 December) of a year of the loan term. In an exemplary scenario, the user chooses to pay a combination of a flat amount and multiple of original installments i.e. the user specifies the number of times the original installment plus any additional sum of money payable as a bullet payment e.g. if the user chooses to make a bullet payment that is ten times the original installment (USD 100) and an extra amount of USD 500, then the amount to be paid as the bullet payment will be 'USD 1000+USD 500' i.e. USD 1500.

In an embodiment of the present invention, the user can schedule one or more bullet payment(s) with a predetermined bullet payment frequency at one or more bullet payment date(s). In an embodiment of the present invention, the user may select a bullet payment frequency such as a half yearly frequency and a yearly frequency. Various options for the selection of a predetermined bullet payment frequency can be provided in an embodiment of the present invention to suit a particular loan structure and the requirements of the user(s) to generate and display a flexible repayment schedule. In an embodiment, the user can make these bullets payments on predefined dates. Further, in another embodiment of the present invention, the one or more bullet payments are made on the basis bullet payment dates and bullet payment amount i.e. amount to be paid as a bullet payment or bonus payment.

In an embodiment of the present invention, the user is provided with one or more graphical user interfaces in order to facilitate the user to calculate the installments as mentioned above. In order to calculate the installments that suit the user's needs, the user is required to enter or select a plurality of predetermined parameters on the one or more graphical user interface(s). The one or more graphical user interface(s) provide an alternative of selecting an option and skipping an option, wherein the graphical user interface automatically moves from a first display window to a second display window in response to selecting the option of skipping. In an exemplary embodiment, each window displays the options such as multiple installments, bullet payments, incrementing/decrementing installments and payment holiday. In an exemplary embodiment of the present invention, if multiple payments in a period are not to be included in the schedule, by the user, then a user interface display window automatically proceeds to a bullet payment display window. In response to selecting any one of the option, user is presented with a window displaying further options/fields corresponding to the selected option. For example, when a user selects an option of incrementing/decrementing installments, the user is presented with a window, where he/she can enter/select the options such as incrementing/decrementing payment type, start date(s) and end date(s) corresponding to incrementing and decrementing installments, payment values in accordance with the payment type selected by the user.

In an embodiment of the present invention, incrementing and/or decrementing installments can be scheduled for a predetermined period of time. The incrementing installments are payments that increase for a predetermined period in the term of the loan. The incrementing installments are scheduled on the basis of one or more of a start date, end date and an incrementing amount calculated on a predetermined basis. In an exemplary embodiment, the incrementing amount is calculated on the basis of a percentage increment, a flat amount or combination of the percentage increment and the flat amount.

In another embodiment of the present invention, decrementing installments can be calculated for a predetermined period of time defined by a start date and an end date. The decrementing installments are payments that decrease for a period in the term of the loan. The decrementing installments are scheduled on the basis of one or more of a start date, end date. In an exemplary embodiment, the decrementing amount is calculated on the basis of a percentage decrement, a flat amount or combination of the percentage decrement and the flat amount.

The user may choose to select incrementing or decrementing installment and may specify the time period for which the incrementing or decrementing installment is applicable. In an exemplary embodiment, the method allows the user to select a period starting from a start date to an end date for which incrementing or decrementing installments are applicable. In an embodiment of the present invention, the user may select an incrementing installment option for one or more installment period(s) and a decrementing installment option for one or more installment period(s). In an embodiment the user can select different sets of start date and end date for which incrementing or decrementing installments are applicable. At least one incrementing installment is scheduled for at least one corresponding predetermined period of time and at least one decrementing installment is scheduled for at least one corresponding predetermined period of time.

In an embodiment of the present invention, the user can select one or more predetermined payment holiday(s). Payment holidays are those installment dates in the schedule when the user does not pay any installment but rather defers the payment until the next installment date in the schedule. A payment holiday can be scheduled on the basis a start date and an end date, the time period between the start date and end date being the payment holiday.

Turning back to FIG. 1, in response to the inputs provided by the user and the calculating step, the method generates a schedule for repayment of the loan at step 115. Thereafter the schedule of the repayment of the loan is displayed at step 120. In an embodiment of the present invention, the loan repayment schedule specifies at least the installment dates and the installment payable on the respective dates. According to an embodiment of the present invention, the installment amounts differ for the various payments or parameters entered by the user such as bullet payments, equated payments, payment holiday(s), incrementing and decrementing installments. In another embodiment of the present invention, the method displays the principal at beginning, the interest payable on the respective dates, the principal amortized and the principal at end.

In an embodiment of the present invention, the installments are calculated on the basis of a governing equation. The governing equation comprises a plurality of parameters. The installments are calculated in accordance with the following governing equation:

$$PV = \frac{A}{(1+r_{\textit{eff}})^{\frac{(ID_1-DD)}{ND}}} + \frac{A}{(1+r_{\textit{eff}})^{\frac{(ID_2-DD)}{ND}}} + K + \frac{A}{(1+r_{\textit{eff}})^{\frac{(ID_n-DD)}{ND}}}$$

wherein PV is the principal amount of the loan (present value of the loan), A is the installment amount, $r_{\textit{eff}}$ is the effective rate of interest, $ID_1$ is the first installment date, $ID_n$ is the last installment date, DD is the disbursement date of the loan and ND is the number of days in the year.

The number of days in a year and the expression ($ID_n$–DD) are governed by an accrual basis. For example, the accrual basis is selected from US30/360, US30/A, US30/365, Actual/Actual, Actual/365 and Actual/360.

In an embodiment of the present invention, the installment amount can be a bullet payment amount given by x A+y where x is a multiplication factor to the original installment, A, and y is a flat amount. In another embodiment of the present invention, any amount of the bullet payment can be made at a predetermined bullet payment frequency. In yet another embodiment of the present invention, the allowable bullet payment amount lies in a predetermined range e.g. less than a fraction of the remaining loan amount. This can also be used as a guide or calculator to assist the user in selecting the bullet payment amount as per his/her needs.

In an embodiment of the present invention, the installment can be an incrementing installment given by p A+q wherein p is a percentage of the original installment, A, and q is a flat amount. In another embodiment of the present invention, the installment can be a decrementing installment given by p A+q wherein p is a percentage of the original installment and q is a flat amount. In yet another embodiment any incrementing or decrementing amount can be entered for a predetermined period. In yet another embodiment, the allowable incrementing or decrementing amount lies in a predetermined range for a predetermined period of time.

In an embodiment of the present invention, the governing equation is solved for one unknown i.e. the installment. The installment thus calculated is used by the system to generate the loan repayment schedule. The method further allows modifications e.g. changing the installment dates and the corresponding payment amount, the multiples of original installment and/or the flat amount using a graphical user interface. A payment type displays the installment payment type i.e. bullet payment, equated payment, payment holiday and incrementing or decrementing installments. Once the modifications in the dates and the amounts of the schedule are made the system re-computes the loan schedule. The final loan repayment schedule is then displayed. The final schedule displays at least the installment dates and the installment payable on the respective dates. These installment amounts differ for the various payments such as bullet payment, equated payment, payment holiday, and incrementing and/or decrementing installments. The method also enables displaying parameters such as the principal at beginning, the interest payable on the respective dates, the principal amortized and the principal at end.

Figure 2:
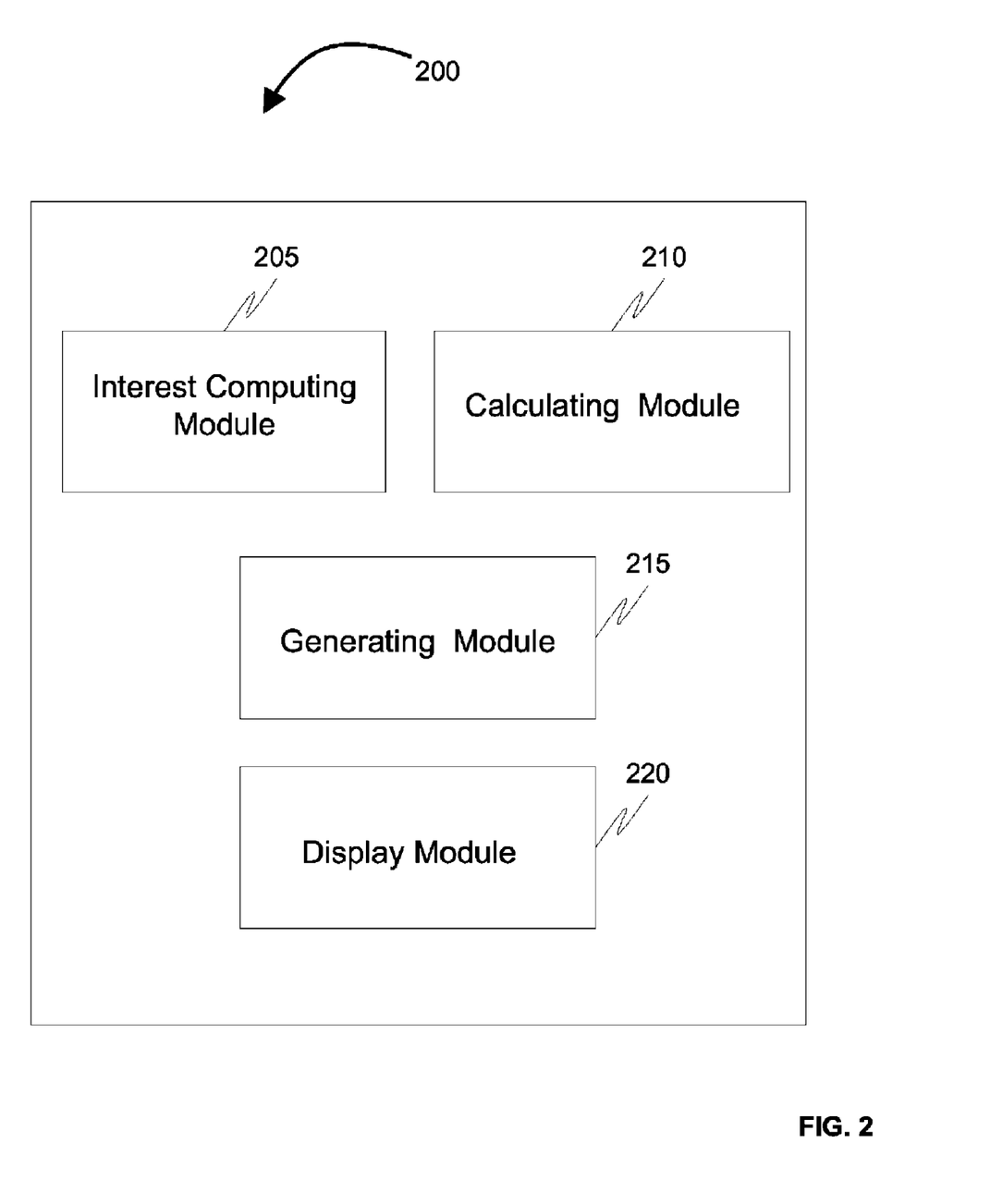
FIG. 2 illustrates a block diagram depicting a system for generating and displaying a flexible schedule for repayment of a loan, in accordance with an embodiment of the present invention.

FIG. 2 is a block diagram showing a system 200 for displaying a flexible schedule for repayment of a loan, in accordance with an embodiment of the present invention. System 200 comprises an interest computing module 205, a calculating module 210, a generating module 215 and a display module 220.

Interest computing module 205 computes an effective rate of interest. The effective rate of interest is computed on the basis of a nominal rate of interest and a compounding frequency. Further, the effective rate of interest is the actual rate of interest paid (or earned) if interest is compounded more than once a year. The compounding frequency is the number of times the financial institution compounds interest on the loan or the deposit.

The usage of effective rate of interest results in more accurate installments for the loan repayment schedule and in turn minimizing an adjustment installment. The adjustment installment is generally last installment which is different from computed installments. In an embodiment of the present invention, besides the nominal rate of interest and the compounding frequency the user inputs a principal loan amount, a loan term, a disbursement date and the predetermined set of parameters. The predetermined set of parameters comprises various combinations of parameters selected from an installment frequency, an accrual basis, a number of installments in a period, dates of installments, date of first installment, period frequency, bullet payment amount, bullet payment frequency, bullet payment type, one or more bullet payment date(s), an incrementing payment amount, an incrementing payment type, one or more incrementing installment period(s), a decrementing payment amount, a decrementing payment type, one or more decrementing installment period(s), a payment holiday and one or more payment holiday period(s). Therefore, system 200 provides greater flexibility for customizing and/or scheduling a repayment of the loan by facilitating the user to enter various parameters as per his/her requirements.

Calculating module 210 calculates installments to be paid based on the effective rate of interest calculated by interest computing module 205. The installments are payable on at least one predetermined date at one or more predetermined period(s) of time. In an embodiment of the present invention, the installments to be paid comprise one or more installments of variable amounts. The one or more predetermined period(s) of time can be a regular period or an irregular period. For example, the installments can be paid on one or more predetermined date(s) on one or more of a weekly basis, fortnightly basis, monthly basis, bimonthly basis, quarterly basis, half yearly basis, yearly basis and an irregular basis. The irregular dates can be of any pattern, for example, two or more installments in a month. Further, a plurality of installments are payable on one or more predetermined date(s) on the basis of one or more period frequency, number of installments to paid, dates of installments and a date of first installment.

In an embodiment of the present invention, calculating module 210 calculates installments to be paid based on a principal loan amount, a loan term, a disbursement date, the effective rate of interest and a predetermined set of parameters. The predetermined set of parameters comprises various combinations of parameters selected from an installment frequency, an accrual basis, a number of installments in a period, dates of installments, date of first installment, period frequency, bullet payment amount, bullet payment frequency, bullet payment type, one or more bullet payment date(s), an incrementing payment amount, an incrementing payment type, one or more incrementing installment period(s), a decrementing payment amount, a decrementing payment type, one or more decrementing installment period(s), a payment holiday and one or more payment holiday period(s).

Further, generating module 215 generates a schedule for repayment of the loan on the basis of installments calculated by calculating module 210. Thereafter display module 220 displays the schedule for repayment of the loan.

Figure 3:
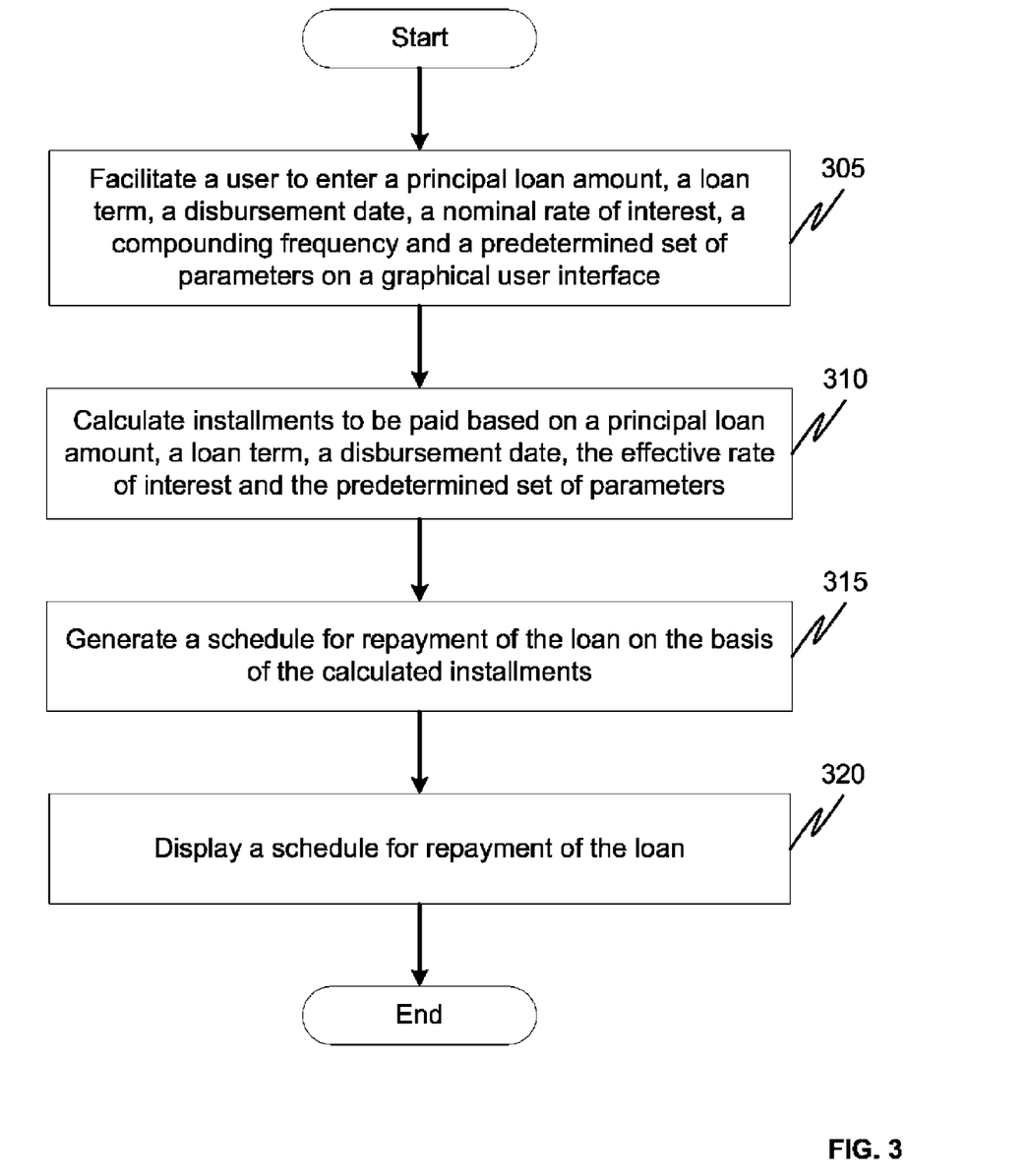
FIG. 3 illustrates a flow diagram for a method for generating and displaying a flexible schedule for repayment of a loan, in accordance with another embodiment of the present invention.

FIG. 3 is a flow diagram illustrating a method for generating and displaying a flexible schedule for repayment of a loan, in accordance with another embodiment of the present invention. At step 305, a user is facilitated to enter a principal loan amount, a loan term, a disbursement date, a nominal rate of interest, a compounding frequency and a predetermined set of parameters on a graphical user interface. The predetermined set of parameters comprises various combinations of parameters selected from a principal amount, an installment frequency, date of disbursement, an accrual basis, a loan term, a number of installments in a period, dates of installments, date of first installment, period frequency, bullet payment amount, bullet payment frequency, bullet payment type, one or more bullet payment date(s), an incrementing payment amount, an incrementing payment type, one or more incrementing installment period(s), a decrementing payment amount, a decrementing payment type, one or more decrementing installment period(s), at least one payment holiday and one or more payment holiday period(s). Thereafter, at step 310, installments to be paid based on an effective rate of interest the predetermined set of parameters are calculated. The effective rate of interest is determined on the basis of the nominal rate of interest and the compounding frequency and the installments are payable on at least one predetermined date at one or more predetermined period(s) of time. At step 315, a schedule for repayment of the loan on the basis of installments calculated at step 310 is generated. Finally, at step 320 the schedule for repayment of the loan is displayed.

In an embodiment of the present invention, the method enables presenting a user with a series of graphical user interfaces wherein one or more graphical user interface(s) provide one or more alternative(s) of selecting an option and skipping an option. In an embodiment the graphical user interface automatically move from a first display window to a second display window in response to selecting the option of skipping. In an exemplary embodiment, if multiple payments in a period are not to be included in the schedule, by the user, then a user interface display window automatically proceeds to a bullet payment display window.

The present invention can be implemented as a computer program product comprising a computer usable medium having a computer readable program embodied therein for displaying a flexible schedule for repayment of a loan. The computer readable program includes at least one component to compute an effective rate of interest, wherein the effective rate of interest is computed on the basis of at least a nominal rate of interest and a compounding frequency and to calculate installments to be paid based on the effective rate of interest and a predetermined set of parameters, wherein the installments are payable on at least one predetermined date at one or more predetermined period(s) of time. The computer program product includes at least one component to generate a schedule for repayment of the loan on the basis of calculated installments and displays a schedule for repayment of the loan. The computer program product further comprises computer readable program for calculating installments to be paid based on the effective rate of interest and a predetermined set of parameters. The predetermined set of parameters comprises various combinations of parameters selected from a principal amount, an installment frequency, date of disbursement, an accrual basis, a loan term, a number of installments in a period, dates of installments, date of first installment, period frequency, bullet payment amount, bullet payment frequency, bullet payment type, one or more bullet payment date(s), an incrementing payment amount, an incrementing payment type, one or more incrementing installment period(s), a decrementing payment amount, a decrementing payment type, one or more decrementing installment period(s), at least one payment holiday and one or more payment holiday period(s).

Various embodiments of the present invention provide systems, methods and computer program products for generating and displaying a flexible and/or customized schedule for repayment of a loan by way of considering an effective rate of interest and enabling a user or borrower to incorporate and accommodate various options such as various user selected combinations of parameters selected from an installment frequency, an accrual basis, a number of installments in a period, dates of installments, date of first installment, period frequency, bullet payment amount, bullet payment frequency, bullet payment type, one or more bullet payment date(s), an incrementing payment amount, an incrementing payment type, one or more incrementing installment period(s), a decrementing payment amount, a decrementing payment type, one or more decrementing installment period(s), at least one payment holiday and one or more payment holiday period(s). This results in a minimum adjustment installment to be paid at the end of the loan repayment schedule. An embodiment of the present invention enables handling of planned advance payments/prepayments along with other user selected parameters.

In the foregoing specification, specific embodiments of the present invention have been described. However, one of ordinary skilled in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as critical, required, or essential features or elements of any or all the claims.

What is claimed is:

1. A computer implemented method for generating and displaying a flexible schedule for repayment of a loan, the method comprising the steps of:

computing an effective rate of interest, wherein the effective rate of interest is computed on the basis of a nominal rate of interest and a compounding frequency;

calculating installments to be paid based on a principal loan amount, a loan term, a disbursement date, the effective rate of interest and a predetermined set of parameters, wherein the installments are payable on at least one predetermined date at one or more predetermined period(s) of time;

generating a schedule for the repayment of the loan on the basis of calculated installments and;

displaying a schedule for repayment of the loan, wherein the installments are calculated in accordance with the following equation:

$$PV = \frac{A}{(1+r_{eff})^{\frac{(ID_1-DD)}{ND}}} + \frac{A}{(1+r_{eff})^{\frac{(ID_2-DD)}{ND}}} + K + \frac{A}{(1+r_{eff})^{\frac{(ID_n-DD)}{ND}}}$$

wherein PV is the principal loan amount, A is the installment amount, $r_{eff}$ is the effective rate of interest, $ID_1$ is the first installment date, $ID_n$ is the last installment date, DD is the disbursement date of the loan and ND is the number of days in the year, wherein said computing, said calculating, said generating and said displaying are performed by a computer system by execution of a computer readable program stored on a computer usable medium.

2. The method as claimed in claim 1, wherein the predetermined set of parameters comprises various combinations of parameters selected from an installment frequency, an accrual basis, a number of installments in a period, dates of installments, date of first installment, period frequency, bullet payment amount, bullet payment frequency, bullet payment type, one or more bullet payment date(s), an incrementing payment amount, an incrementing payment type, one or more incrementing installment period(s), a decrementing payment amount, a decrementing payment type, one or more decrementing installment period(s), a payment holiday and one or more payment holiday period(s).

3. The method as claimed in claim 1, wherein the installments to be paid comprise installments of variable amounts.

4. The method as claimed in claim 1, wherein the installments are payable on at least one predetermined date on one or more of a weekly basis, fortnightly basis, monthly basis, bimonthly basis, quarterly basis, half yearly basis, yearly basis and irregular basis.

5. The method as claimed in claim 1, wherein the predetermined period of time is a regular period or an irregular period or a combination of a regular period and an irregular period.

6. The method as claimed in claim 1, wherein the multiple installments are payable at a predetermined period of time on the basis of one or more of a period frequency, number of installments, dates of installments and a date of first installment.

7. The method as claimed in claim 2, wherein at least one bullet payment with a predetermined bullet payment frequency is made at one or more bullet payment date(s), said bullet payment being at least one of a multiple of original installment and a flat amount.

8. The method as claimed in claim 2, wherein the accrual basis is selected from US30/360, US30/A, US30/365, Actual/Actual, Actual/365 and Actual/360.

9. The method as claimed in claim 2, wherein the installments are incremented for one or more predetermined period(s) of time.

10. The method as claimed in claim 9, wherein the installments are incremented on the basis of an incrementing payment type, said incrementing payment type being at least one of a percentage of the original installment amount and a flat amount.

11. The method as claimed in claim 2, wherein the installments are decremented for one or more predetermined period(s) of time.

12. The method as claimed in claim 11, wherein the installments are decremented on the basis of a decrementing payment type, said decrementing payment type being at least one of a percentage of the original installment amount and a flat amount.

13. The method as claimed in claim 9 or 11, wherein the predetermined period of time is selected on the basis of at least one set of a start date and an end date.

14. The method as claimed in claim 2, wherein the at least one incrementing installment is scheduled for at least one corresponding predetermined period of time and at least one decrementing installment is scheduled for at least one corresponding predetermined period of time.

15. The method as claimed in claim 2, wherein the at least one payment holiday is scheduled on the basis of at least one payment holiday period.

16. The method as claimed in claim 15, wherein said at least one payment holiday period is selected on the basis of at least one set of a start date and an end date, the time period between the start date and end date being the payment holiday.

17. The method as claimed in claim 1, wherein the number of days in a year and the expression $(ID_n-DD)$ are governed by an accrual basis.

18. The method as claimed in claim 1 wherein the installment amount (A) is a bullet payment amount given by x A+y where x is the times the original installment and y is a flat amount.

19. The method as claimed in claim 1, wherein the installment is one of an incrementing installment and a decrementing installment is given by p A+q wherein p is a percentage of the original installment and q is a flat amount.

20. A system for generating and displaying a flexible schedule for repayment of a loan, the system comprising:
an interest computing module for computing an effective rate of interest, wherein the effective rate of interest is computed on the basis of a nominal rate of interest and a compounding frequency;
a calculating module for calculating installments to be paid based on a principal loan amount, a loan term, a disbursement date, the effective rate of interest and a predetermined set of parameters, wherein the installments are payable on at least one predetermined date at one or more predetermined period(s) of time;
a generating module for generating a schedule for repayment of the loan on the basis of installments calculated by the calculating module and;
a display module for displaying the schedule for repayment of the loan, wherein the installments are calculated by said calculating module in accordance with the following equation:

$$PV = \frac{A}{(1+r_{eff})^{\frac{(ID_1-DD)}{ND}}} + \frac{A}{(1+r_{eff})^{\frac{(ID_2-DD)}{ND}}} + K + \frac{A}{(1+r_{eff})^{\frac{(ID_n-DD)}{ND}}}$$

wherein PV is the principal loan amount, A is the installment amount, $r_{eff}$ is the effective rate of interest, $ID_1$ is the first installment date, $ID_n$ is the last installment date, DD is the disbursement date of the loan and ND is the number of days in the year.

21. The system as claimed in claim 20, wherein the predetermined set of parameters comprises various combinations of parameters selected from, an installment frequency, an accrual basis, a number of installments in a period, dates of installments, date of first installment, period frequency, bullet payment amount, bullet payment frequency, bullet payment type, one or more bullet payment date(s), an incrementing payment amount, an incrementing payment type, one or more incrementing installment period(s), a decrementing payment amount, a decrementing payment type, one or more decrementing installment period(s), a payment holiday and one or more payment holiday period(s).

22. A computer implemented method for generating and displaying a flexible schedule for repayment of a loan, the method comprising:

facilitating a user to enter a principal loan amount, a loan term, a disbursement date, a nominal rate of interest, a compounding frequency and a predetermined set of parameters on a graphical user interface; the predetermined set of parameters comprises various combinations of parameters selected from an installment frequency, an accrual basis, a number of installments in a period, dates of installments, date of first installment, period frequency, bullet payment amount, bullet payment frequency, bullet payment type, one or more bullet payment date(s), an incrementing payment amount, an incrementing payment type, one or more incrementing installment period(s), a decrementing payment amount, a decrementing payment type, one or more decrementing installment period(s), at least one payment holiday and one or more payment holiday period(s);

calculating installments to be paid based on a principal loan amount, a loan term, a disbursement date, an effective rate of interest and the predetermined set of parameters, wherein the effective rate of interest is determined on the basis of the nominal rate of interest and the compounding frequency, the installments are payable on at least one predetermined date at one or more predetermined period(s) of time;

generating a schedule for repayment of the loan on the basis of calculated installments and;

displaying a schedule for repayment of the loan, wherein the installments are calculated in accordance with the following equation:

$$PV = \frac{A}{(1+r_{eff})^{\frac{(ID_1-DD)}{ND}}} + \frac{A}{(1+r_{eff})^{\frac{(ID_2-DD)}{ND}}} + K + \frac{A}{(1+r_{eff})^{\frac{(ID_n-DD)}{ND}}}$$

wherein PV is the principal loan amount, A is the installment amount, $r_{eff}$ is the effective rate of interest, $ID_1$ is the first installment date, $ID_n$ is the last installment date, DD is the disbursement date of the loan and ND is the number of days in the year, wherein said facilitating, said calculating, said generating and said displaying are performed by a computer system by execution of a computer readable program stored on a computer usable medium.

23. The method as claimed in claim 22, further comprises presenting a user with a series of graphical user interfaces wherein one or more graphical user interface(s) provide one or more alternative(s) of selecting an option and skipping an option, wherein the graphical user interface automatically moves from a first display window to a second display window in response to selecting the option of skipping.

24. A computer program product comprising a computer usable medium having a computer readable program stored therein, said computer readable program when executed by a computer system generates and displays a flexible schedule for repayment of a loan, wherein the computer readable program includes at least one component to:

compute an effective rate of interest, wherein the effective rate of interest is computed on the basis of at least a nominal rate of interest and a compounding frequency;

calculate installments to be paid based on the paid based on a principal loan amount, a loan term, a disbursement date, an effective rate of interest and a predetermined set of parameters, wherein the predetermined set of parameters comprises various combinations of parameters selected from an installment frequency, an accrual basis, a number of installments in a period, dates of installments, date of first installment, period frequency, bullet payment amount, bullet payment frequency, bullet payment type, one or more bullet payment date(s), an incrementing payment amount, an incrementing payment type, one or more incrementing installment period(s), a decrementing payment amount, a decrementing payment type, one or more decrementing installment period(s), at least one payment holiday and one or more payment holiday period and wherein the installments are payable on at least one predetermined date at one or more predetermined period(s) of time;

generate a schedule for repayment of the loan on the basis of calculated installments and;

display a schedule for repayment of the loan, wherein the installments are calculated in accordance with the following equation:

$$PV = \frac{A}{(1+r_{eff})^{\frac{(ID_1-DD)}{ND}}} + \frac{A}{(1+r_{eff})^{\frac{(ID_2-DD)}{ND}}} + K + \frac{A}{(1+r_{eff})^{\frac{(ID_n-DD)}{ND}}}$$

wherein PV is the principal loan amount, A is the installment amount, $r_{eff}$ is the effective rate of interest, $ID_1$ is the first installment date, $ID_n$ is the last installment date, DD is the disbursement date of the loan and ND is the number of days in the year.

* * * * *

UNITED STATES PATENT AND TRADEMARK OFFICE
CERTIFICATE OF CORRECTION

PATENT NO. : 7,870,048 B2
APPLICATION NO. : 12/017051
DATED : January 11, 2011
INVENTOR(S) : Mandar Arvind Bhagwat It is certified that error appears in the above-identified patent and that said Letters Patent is hereby corrected as shown below:

In column 6, line 58, delete "the use" and insert -- the user --, therefor.

In column 13, line 1-5, in claim 1, delete " $+K+\dfrac{A}{(1+r_{\mathit{eff}})^{\frac{(ID_n-DD)}{ND}}}$ " and insert -- $+\ldots+\dfrac{A}{(1+r_{\mathit{eff}})^{\frac{(ID_n-DD)}{ND}}}$ --, therefor.

In column 14, line 49-50, in claim 20, delete " $+K+\dfrac{A}{(1+r_{\mathit{eff}})^{\frac{(ID_n-DD)}{ND}}}$ " and insert -- $+\ldots+\dfrac{A}{(1+r_{\mathit{eff}})^{\frac{(ID_n-DD)}{ND}}}$ --, therefor.

In column 15, line 37-39, in claim 22, delete " $+K+\dfrac{A}{(1+r_{\mathit{eff}})^{\frac{(ID_n-DD)}{ND}}}$ " and insert -- $+\ldots+\dfrac{A}{(1+r_{\mathit{eff}})^{\frac{(ID_n-DD)}{ND}}}$ --, therefor.

Signed and Sealed this
Twenty-seventh Day of September, 2011

David J. Kappos
*Director of the United States Patent and Trademark Office*

CERTIFICATE OF CORRECTION (continued)

U.S. Pat. No. 7,870,048 B2

In column 16, line 40-42, in claim 24, delete " $+ K + \dfrac{A}{(1 + r_{eff})^{\frac{(ID_n - DD)}{ND}}}$ " and insert -- $+ \ldots + \dfrac{A}{(1 + r_{eff})^{\frac{(ID_n - DD)}{ND}}}$ --, therefor.